(12) United States Patent
Kaneko

(10) Patent No.: US 12,485,368 B2
(45) Date of Patent: Dec. 2, 2025

(54) AGITATING/DEFOAMING APPARATUS

(71) Applicant: MITSUBOSHI KOGYO CO., LTD., Jouetsu (JP)

(72) Inventor: Yoshiaki Kaneko, Jouetsu (JP)

(73) Assignee: MITSUBOSHI KOGYO CO., LTD., Jouetsu (JP)

( * ) Notice: Subject to any disclaimer, the term of this patent is extended or adjusted under 35 U.S.C. 154(b) by 733 days.

(21) Appl. No.: 17/785,721

(22) PCT Filed: Dec. 8, 2020

(86) PCT No.: PCT/JP2020/045604
§ 371 (c)(1),
(2) Date: Jun. 15, 2022

(87) PCT Pub. No.: WO2021/124976
PCT Pub. Date: Jun. 24, 2021

(65) Prior Publication Data
US 2023/0049238 A1    Feb. 16, 2023

(30) Foreign Application Priority Data
Dec. 16, 2019  (JP) .................. 2019-226546

(51) Int. Cl.
*B01D 19/00* (2006.01)
*B01F 29/10* (2022.01)
*B29B 7/84* (2006.01)

(52) U.S. Cl.
CPC .......... *B01D 19/0052* (2013.01); *B01F 29/10* (2022.01); *B29B 7/845* (2013.01)

(58) Field of Classification Search
CPC ..... B01D 19/0052; B01D 19/02; B01F 29/10; B01F 29/90; B29B 7/845; B29B 7/106
(Continued)

(56) References Cited

FOREIGN PATENT DOCUMENTS

| JP | 4-275868 A | 10/1992 |
|---|---|---|
| JP | 8-332367 A | 12/1996 |

(Continued)

OTHER PUBLICATIONS

International Search Report (PCT/ISA/210) issued in PCT/JP2020/045604, dated Jan. 26, 2021.
(Continued)

*Primary Examiner* — T. Bennett McKenzie
(74) *Attorney, Agent, or Firm* — Birch, Stewart, Kolasch & Birch, LLP

(57) ABSTRACT

An agitating/defoaming apparatus adjusts a rotation speed and, even with respect to a material high in viscosity, prevents or reduces an increase in temperature of the material during agitating/defoaming. The agitating/defoaming apparatus includes a plurality of container holders, each holding a container. A revolution member supports each container holder so as to be rotatable, is provided in such a way as to be rotatable on a first rotational shaft, and causes each container holder to revolve around the first rotational shaft. A first drive rotationally drives the revolution member. A control unit performs drive control. An annular outer ring is arranged to surround the container holders in such a way as to be in abutting contact with an outer circumferential portion of each container holder. An outer ring rotation mechanism rotates the outer ring with a central axis of the outer ring set coincident with that of the revolution member.

7 Claims, 4 Drawing Sheets

PORTION A

(58) Field of Classification Search
USPC .......................................................... 95/261
See application file for complete search history.

(56) References Cited

FOREIGN PATENT DOCUMENTS

| | | | |
|---|---|---|---|
| JP | 2008-119603 A | 5/2008 | |
| KR | 10-2006-0114637 A | 11/2006 | |
| WO | WO 2012/172664 A1 | 12/2012 | |
| WO | WO-2013183554 A1 * | 12/2013 | ............... B04B 5/02 |

OTHER PUBLICATIONS

Notice of Submission of Opinion issued from Korea (Ministry of Intellectual Property) in Application No. 10-2022-7017832 on Oct. 21, 2025, with English translation.

* cited by examiner

PORTION A

AGITATING/DEFOAMING APPARATUS

TECHNICAL FIELD

The present invention relates to an agitating/defoaming apparatus and, in more detail, relates to an agitating/defoaming apparatus which includes means for causing a container to rotate and causing the container to revolve and turns the container to perform at least one of agitation and defoaming of a material contained in the container.

BACKGROUND ART

Heretofore, an agitating/defoaming apparatus has been in practical use, which includes means for causing a container to rotate and causing the container to revolve and performs agitation or defoaming on a single material or mixed materials contained in the container. Examples of such materials include a medicinal product, a chemical material, food goods, a coating material, single or mixed liquid materials (including fluent materials) in the field of, for example, semiconductor device materials, and mixed materials including a liquid material and a powder material (hereinafter each simply referred to as a "material").

Here, as an example of a conventional agitating/defoaming apparatus, an agitating/defoaming apparatus described in PTL 1 has been proposed (see PTL 1: JP-A-8-332367).

CITATION LIST

Patent Literature

PTL 1: JP-A-8-332367

SUMMARY OF INVENTION

Technical Problem

Here, in an agitating/defoaming apparatus such as that described as an example in PTL 1, when the revolution speed becomes high, along with this, the rotation speed becomes further high. At that time, issues may arise in which, with regard to, for example, a material particularly high in viscosity, due to, for example, a frictional force or shearing force acting on the material, the material generates heat to produce an excessive increase in temperature, so that the transformation or deterioration of the material occurs or an agitation action also decreases.

Solution to Problem

In response to the above issues, one or more aspects of the present invention are directed to, by achieving a mechanism capable of adjusting a rotation speed under a revolution speed being fixed, providing an agitating/defoaming apparatus capable of, even with respect to a material high in viscosity, preventing or reducing an increase in temperature of the material at the time of agitating/defoaming to prevent any deformation or deterioration of the material and capable of obtaining a reliable agitating/defoaming action.

The present invention solves the above-mentioned issues by solution means such as that described in the following.

According to an aspect of the present invention, the agitating/defoaming apparatus, which includes means for causing a container to rotate and causing the container to revolve and turns the container to perform at least one of agitation and defoaming of a material contained in the container, includes a plurality of container holders each of which holds the container, a revolution member which supports each of the plurality of container holders so as to be rotatable, is provided in such a way as to be rotatable on a first rotational shaft, and causes each of the plurality of container holders to revolve around the first rotational shaft, first drive means which rotationally drives the revolution member, an annular outer ring arranged to surround the plurality of container holders in such a manner that an inner circumferential portion of the outer ring is in abutting contact with an outer circumferential portion of each of all of the plurality of container holders, a case formed so as to be hermetically sealable and having at least the container, the plurality of container holders, the revolution member, and the outer ring arranged therein, and a control unit which performs drive control, wherein the plurality of container holders and the outer ring are arranged in such a manner that an abutting contact portion provided at the outer circumferential portion of each of the plurality of container holders and an abutting contact surface provided at the inner circumferential portion of the outer ring are in abutting contact with each other, wherein each of the plurality of container holders has a configuration to revolve around the first rotational shaft by revolution of the revolution member and rotate by a frictional force received from the outer ring, and wherein the agitating/defoaming apparatus further includes outer ring rotation means which rotates the outer ring with a central axis of the outer ring set coincident with that of the revolution member.

Advantageous Effects of Invention

According to one or more aspects of the present invention, a configuration which obtains a revolution action and a rotation action for a container and turns an outer ring is achieved, so that it becomes possible to variably adjust a rotation speed with a revolution speed kept constant. This enables, with respect to a material relatively high in viscosity, adjusting a rotation speed so as to be low and preventing or reducing an increase in temperature of the material caused by, for example, a frictional force or shearing force acting on the material, so that it is possible to prevent any transformation or deterioration of the material and it is possible to prevent a decrease in agitation action. On the other hand, with respect to a material relatively low in viscosity, it is possible to adjust a rotation speed so as to be high and it is possible to increase the agitation action further.

BRIEF DESCRIPTION OF DRAWINGS

FIGS. 3A and 3B are schematic views illustrating an example of the agitating/defoaming apparatus illustrated in FIG. 1, in which FIG. 3A is a sectional view taken along line B-B and FIG. 3B is a front sectional view.

DESCRIPTION OF EMBODIMENTS

Figure 1:
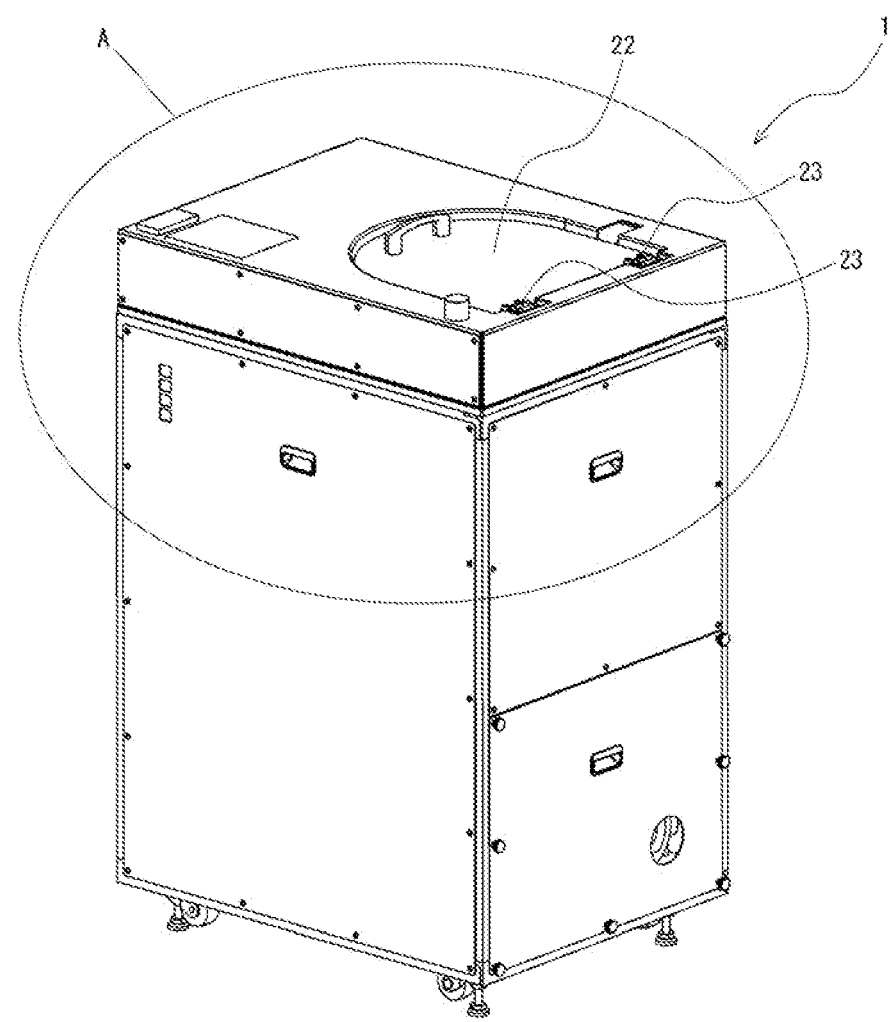
FIG. 1 is a perspective view illustrating an example of an agitating/defoaming apparatus according to an embodiment of the present invention.
Figure 2:
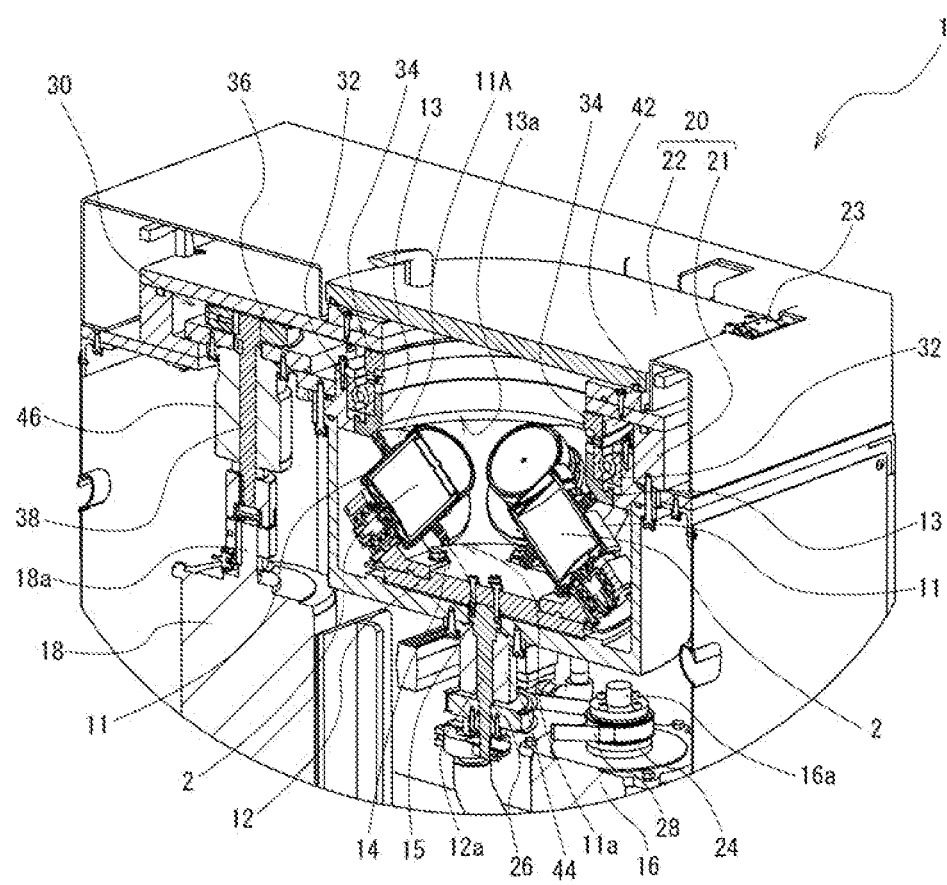
FIG. 2 is a perspective sectional view of a portion A of the agitating/defoaming apparatus illustrated in FIG. 1.
Figure 3A:
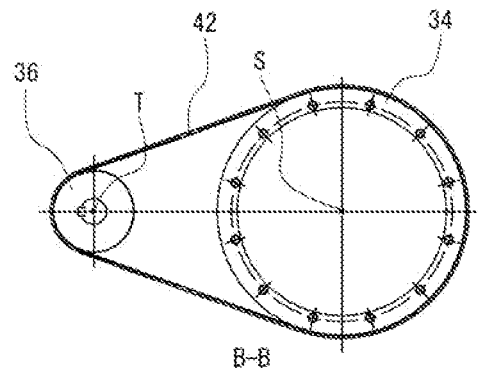
Figure 3B:
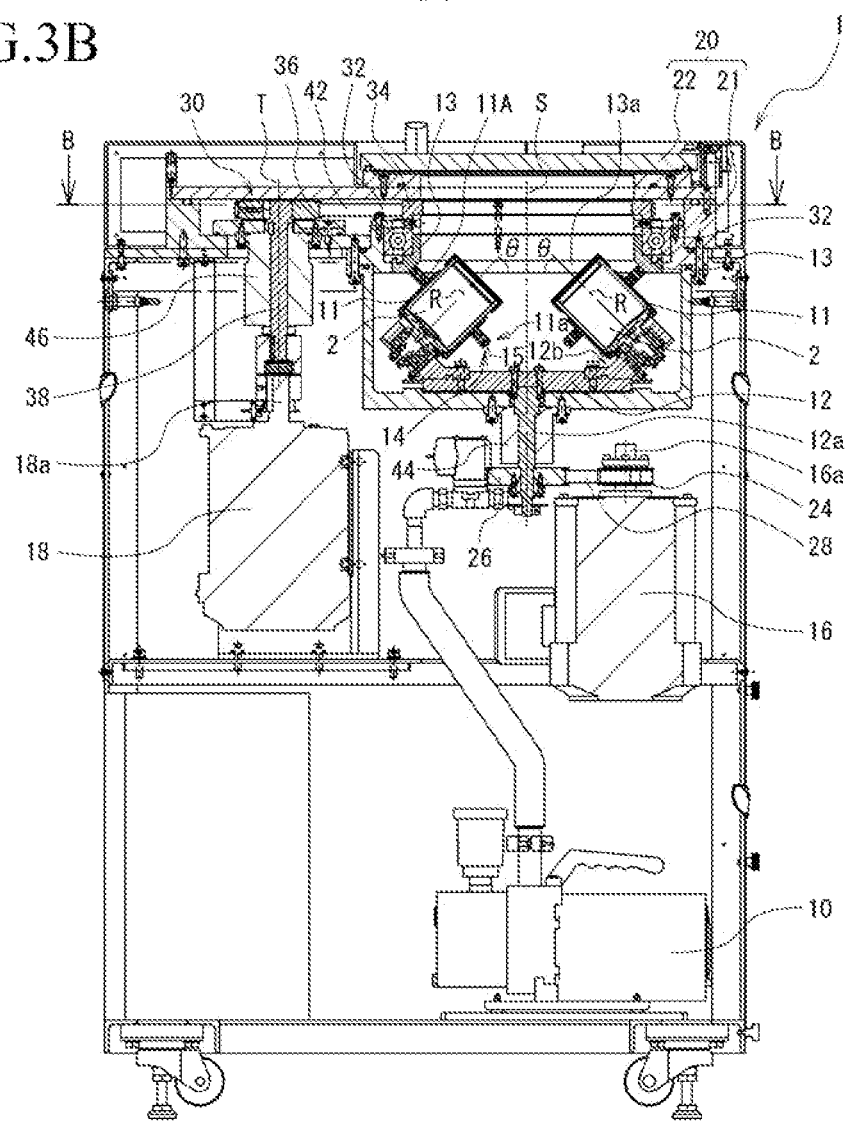

Embodiments of the present invention are described below in detail with reference to the drawings. FIG. 1 is a perspective view (schematic view) illustrating an example of an agitating/defoaming apparatus 1 according to an embodiment of the present invention, and FIG. 2 is a perspective sectional view (schematic view) of a portion A of the agitating/defoaming apparatus 1. Moreover, FIG. 3A is a sectional view taken along line B-B and FIG. 3B is a front sectional view. Furthermore, in all of the figures illustrating each embodiment, members having the respective same functions are assigned the respective same reference characters, and any repetitive description thereof may be omitted. Moreover, for the sake of simplifying figures, some bolts and nuts or the like are omitted from illustration.

The agitating/defoaming apparatus 1, which includes means for causing a container 2 to rotate and means for causing the container 2 to revolve, is an apparatus configured to, by causing the container 2 to rotate and revolve, perform at least one of agitation and defoaming (hereinafter referred to as "agitating/defoaming") of a single material or mixed materials contained in the container 2.

The agitating/defoaming apparatus 1 according to the present embodiment includes, as illustrated in FIG. 1 to FIGS. 3A and 3B, a plurality of containers 2 capable of containing therein various materials to be subjected to agitating/defoaming, a plurality of container holders 11 each of which holds the container 2, a revolution member 12 which supports each of the plurality of container holders 11 so as to be rotatable, is provided in such a way as to be rotatable on a first rotational shaft 12a, and causes each of the plurality of container holders 11 to revolve around the first rotational axis 12a, an annular outer ring 13 arranged in parallel with a revolution plane of the revolution member 12 to surround all of the container holders 11 in such a manner that an abutting contact surface 13a of an inner circumferential portion of the outer ring 13 is in abutting contact with an abutting contact portion 11a of an outer circumferential portion of each of all of the container holders 11, first drive means (in the present embodiment, an electric motor) 16 which rotationally drives the revolution member 12, and a control unit (not illustrated) which performs drive control of, for example, the first drive means 16 and second drive means 18 (described below).

In the present embodiment, the container holders 11, the containers 2, each of which is held by each of the container holders 11, the revolution member 12, and the outer ring 13 are arranged inside a case 20. Here, the formation materials for these components to be used include general structural materials including metallic materials or resin materials, and are not specifically limited (the same applying to other configurations). Furthermore, duralumin is suitably used as a reinforcing member.

First, the case 20 is configured to include a main body portion 21 and a lid portion 22, which is arranged at an upper portion of the main body portion 21. Moreover, the lid portion 22 is fixed to the main body portion 21 in such a way as to be openable and closable via hinges 23 and is formed to have a structure capable of being closely attached to the main body portion 21, so that the case 20 is formed to have a structure in which the inside thereof is able to be hermetically sealed. Additionally, the agitating/defoaming apparatus 1 includes a vacuum pump 10, which vacuumizes the inside of the case 20. The degree of vacuum to be provided by the vacuum pump 10 can be set as appropriate, and, for example, the inside of the case 20 can be brought into a vacuum state of about atmospheric pressure to 10 pascal (Pa).

According to this configuration, opening the lid portion 22 makes it possible to attach or detach the container 2 to or from the container holder 11. On the other hand, closing the lid portion 22 makes it possible to bring the inside of the case 20 into an airtight state, so that it becomes possible to perform agitating/defoaming of a material contained in the container 2 by causing the container 2 to rotate and revolve. Particularly, performing agitating/defoaming with the inside of the case 20 brought into an vacuum state enables increasing a defoaming action further. Furthermore, for example, the lid portion 22 is formed with a transparent resin material.

Next, as illustrated in FIG. 1 to FIGS. 3A and 3B, the revolution member 12 includes the first rotational shaft 12a, which penetrates through the main body portion 21 of the case 20, and the first rotational shaft 12a is rotatably supported by and fixed to the main body portion 21 of the case 20 via a bearing (for example, a magnetic fluid bearing) 44, which enables keeping the inside of the case 20 vacuum. Here, a structure in which the shape of the revolution member 12 is, for example, a disc shape, an arm shape, or a combination of those shapes is conceivable. In the present embodiment, to support the container holder 11 so as to be rotatable while inclining the container holder 11 at a predetermined inclination angle θ (described below in detail) with respect to a revolution plane (a plane perpendicular to a revolution axis, i.e., a central axis S of the first rotational shaft 12a), the revolution member 12 includes a bent and folded portion 12b at a halfway portion thereof in the radial direction. When centrifugal force acts on the container holder 11 (and the container 2) due to turn (revolution) of the revolution member 12, an action occurs in which, particularly, the bent and folded portion 12b deflects in such a way as to come close to a state parallel to the revolution plane. Accordingly, it is favorable that the revolution member 12 is formed with a high-strength and lightweight material such as duralumin. However, the present embodiment is not limited to this.

Moreover, the first rotational shaft 12a and a drive shaft 16a of the first drive means 16 are coupled to each other via drive force transmission means. Furthermore, while, in the present embodiment, the drive force transmission means is configured with a third pulley 24, a fourth pulley 26, and a transmission member (for example, a timing belt) 28, the present embodiment is not limited to this, and the drive force transmission means can be configured with, for example, a chain and gears.

Moreover, while, in the present embodiment, a structure which includes four container holders 11 at regular intervals in the circumferential direction (i.e., in a cross shape centering on the first rotational shaft 12a) and is thus capable of holding four containers 2 is employed, the present embodiment is not limited to this.

Figure 4:
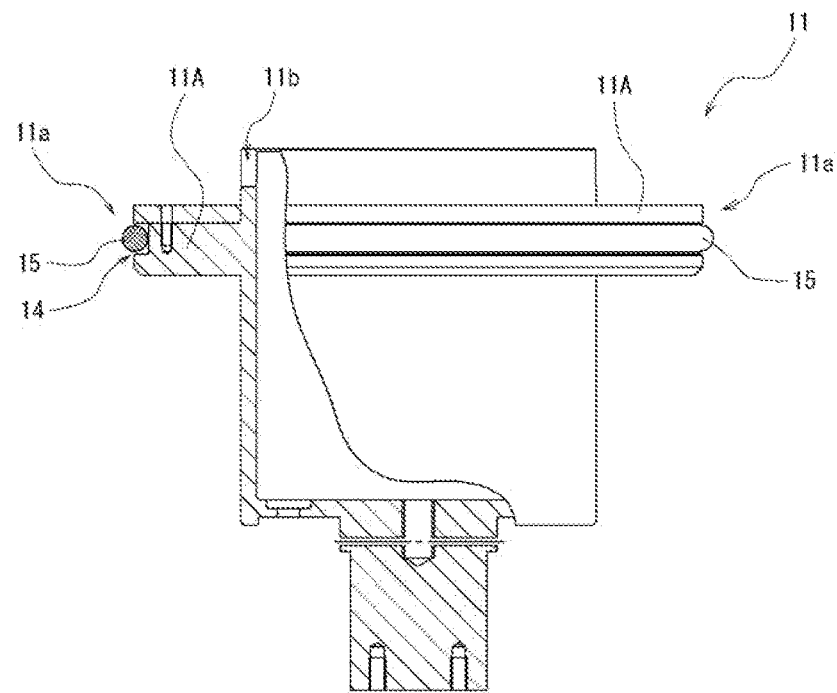
FIG. 4 is a front view (partial sectional view) illustrating an example of a container holder included in the agitating/defoaming apparatus illustrated in FIG. 1.

Here, as illustrated in FIG. 4, the container holder 11 is formed in a bottomed cylindrical shape capable of holding the container 2 therein and includes an abutting contact portion 11a provided in an annular form at an outer circumferential portion thereof. The abutting contact portion 11a is provided at a fore-end portion in the radial direction of a flange-like member 11A provided extending in the radial direction from the outer circumferential portion of the container holder 11.

The abutting contact portion 11a in the present embodiment has a U-shaped groove 14 which is provided in an annular form along the circumferential direction at the fore-end portion in the radial direction of the flange-like member 11A and the shape of a cross-section of which in the radial direction is a U shape. Additionally, a resin elastic ring 15 serving as an elastic body for abutting contact is provided to be fitted in the U-shaped groove 14. For example, an O-ring made from a rubber material (for example, silicon rubber with a hardness of 50 is favorable) is used as the resin elastic ring 15, and, to prevent the occurrence of, for example, slipping, deflection, or looseness, the resin elastic ring 15 is provided to be fitted in the U-shaped groove 14 in the state of generating a predetermined tension in a direction for diameter reduction.

On the other hand, the annular outer ring 13, which is provided to cause rotation of the container holder 11, is arranged in the case 20. For example, the outer ring 13 is formed with a stainless material, but can be formed with another metallic material or resin material. As a more specific configuration, as illustrated in FIG. 1 to FIGS. 3A and 3B, the outer ring 13 in the present embodiment has an abutting contact surface 13$a$, which is provided in an annular form along the circumferential direction at an inner circumferential portion thereof. The abutting contact surface 13$a$ is formed in a curved surface (conic inner surface) shape along the inner circumferential portion, and serves as an abutting contact surface for the abutting contact portion 11$a$ provided at the outer circumferential portion of the container holder 11 (here, the resin elastic ring 15). The abutting contact surface 13$a$ is formed in such a way as to have a predetermined angle (for example, an angle equal to or nearly equal to the above-mentioned angle $\theta$) with respect to the arrangement plane of the outer ring 13 provided in parallel with the revolution plane of the revolution member 12.

The container holder 11 and the outer ring 13 configured as described above are arranged in such a manner that the abutting contact portion 11$a$ (here, the resin elastic ring 15) and the abutting contact surface 13$a$ are in abutting contact with each other.

Figure 5:
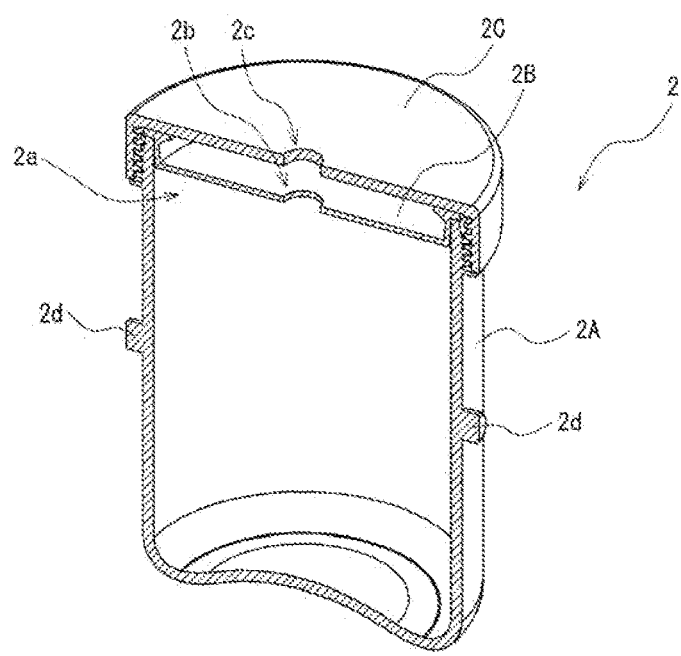
FIG. 5 is a perspective sectional view illustrating an example of a container included in the agitating/defoaming apparatus illustrated in FIG. 1.

Next, as illustrated in FIG. 5, the container 2 is configured to include a bottomed cylindrical main body portion 2A, at an upper portion of which an opening portion 2$a$ is provided, an inner lid 2B, which is fitted in the opening portion 2$a$, and an outer lid 2C, which is screwed to the opening portion 2$a$ from outside the inner lid 2B. As a usage example, a material targeted for agitating/defoaming is put into the main body portion 2A from the opening portion 2$a$ with the inner lid 2B and the outer lid 2C detached from the main body portion 2A and, then, the inner lid 2B and the outer lid 2C are fitted and screwed to the main body portion 2A. Furthermore, while, in the present embodiment, the inner lid 2B and the outer lid 2C are provided with ventilation holes 2$b$ and 2$c$, respectively, a configuration in which the ventilation holes 2$b$ and 2$c$ are omitted can be employed as appropriate. Additionally, a configuration in which the inner lid 2B and the outer lid 2C are omitted can be employed as appropriate. Moreover, to accelerate agitation of a material, a configuration in which raised portions are provided at the inner wall surface of the main body portion 2A can be employed (not illustrated).

As illustrated in FIG. 1 to FIGS. 3A and 3B, the container 2 is held by the container holder 11 by being caused to enter the opening portion of the container holder 11, an upper portion of which is formed in a cup shape, starting with the bottom surface of the container 2 and being fitted in the container holder 11. At that time, projections 2$d$ (in the present embodiment, two projections) provided at the outer circumferential portion of the main body portion 2A of the container 2 are engaged with grooves 11$b$ provided at the container holder 11. With this structure, when the container holder 11 turns (rotates), the container 2 is prevented from rotationally moving in the circumferential direction with respect to the container holder 11 and the rotational force of the container holder 11 is transmitted to the container 2, so that an action to cause the container 2 to turn (rotate) can be obtained.

According to the above-described configuration, when the first drive means 16 operates, the rotary drive force thereof is transmitted to the first rotational shaft 12$a$ via drive force transmission means, and, thus, the first rotational shaft 12$a$ rotates, along with this, the revolution member 12 turns in the circumferential direction. Accordingly, the container holder 11 fixed to the revolution member 12 and the container 2 held by the container holder 11 circle around (revolve) on respective predetermined trajectories in the same plane having a rotational center on the central axis S of the first rotational shaft 12$a$. Additionally, when the revolution member 12 revolves, the container holder 11 rotates due to a frictional force occurring by abutting contact between the abutting contact portion 11$a$ (here, the resin elastic ring 15) of the outer circumferential portion of the container holder 11 and the abutting contact surface 13$a$ of the inner circumferential portion of the outer ring 13. Accordingly, an action in which the container holder 11 and the container 2 held by the container holder 11 revolve and rotate is obtained. This enables effectively performing agitating/defoaming of a material contained in the container 2. Furthermore, the revolution speed and rotation speed at that time are set as appropriate according to the material.

In the present embodiment, the revolution direction of the revolution member 12, i.e., the revolution direction of the container holder 11 and the container 2 held by the container holder 11, and the rotation direction of the container holder 11 and the container 2 held by the container holder 11 are able to be set as opposite directions. As a result, as compared with a case where the revolution direction and rotation direction of the container holder 11 (the container 2) are set as the same direction, it becomes possible to dramatically improve an agitation action for a material contained in the container 2. Furthermore, this advantageous effect is the one which was subjected to experimental proof as a result of comparison experiment using a high-viscosity agitation-target material such as grease.

Moreover, in the present embodiment, the container holder 11 is arranged in such a manner that the axis of rotation R of the container holder 11 has a predetermined angle $\theta$ with respect to the arrangement plane of the outer ring 13, which is provided in parallel with the revolution plane of the revolution member 12. For example, the predetermined angle $\theta$ is set to $40° \leq \theta \leq 60°$. In this way, performing rotation and revolution while keeping the container 2 inclined at a predetermined angle enables further increasing an agitating/defoaming action for a material contained in the container 2.

Here, in the present embodiment, the total length of the abutting contact surface 13$a$ of the outer ring 13 (i.e., the length in the circumferential direction of the abutting contact surface 13$a$) is formed in such a way as to be longer than the total length of the resin elastic ring 15 of the abutting contact portion 11$a$ of the container holder 11 (i.e., the length in the circumferential direction of the abutting contact portion 11$a$). According to this, it becomes possible to make the rotation speed (rotational speed [rpm]) higher than the revolution speed (rotational speed [rpm]) and thus increase an agitation action. For example, the total length of the abutting contact surface 13$a$ of the outer ring 13 is set to two times the total length of the resin elastic ring 15 of the container holder 11. Accordingly, in a case where the revolution speed is set to 800 rpm, the rotation speed is set to 1,600 rpm based on a ratio between the total length of the abutting contact surface 13a and the total length of the resin elastic ring 15 (here, 2:1). Furthermore, the above-mentioned revolution speed and rotation speed are not upper limits, but can be set to higher speeds.

On the other hand, as a result of active research, the inventor of the present invention ascertained that, if the revolution speed and rotation speed were made higher, the following issue might occur. Specifically, if the revolution speed becomes higher, along with that, the rotation speed becomes further higher (in the above-mentioned example, the rotation speed becomes two times the revolution speed). As long as a standard material is targeted, an excellent function effect capable of enhancing an agitation capability can be obtained. However, in the case of a material high in viscosity, the material generates heat due to, for example, a frictional force or shearing force acting on the material, so that an excessive increase in temperature of the material occurs. As a result of this increase, there appears an issue in which the deformation or deterioration of the material itself (specifically, for example, breakage of a material organization or denaturalization thereof by heat) occurs or an agitation action also decreases.

To attain the solution of the above-mentioned issue, in the present embodiment, outer ring rotation means 30 is provided which rotates the outer ring 13 with a central axis of the outer ring 13 set coincident with that of the revolution member 12 (i.e., in such a manner that the axis serving as the center of rotation becomes coaxial with the central axis S of the first rotational shaft 12a of the revolution member 12). More specifically, the outer ring rotation means 30 is configured to include a bearing member 32, which is arranged inside the case 20 and supports the outer ring 13 in a rotatable manner, an annular first pulley 34, which is fixed to the outer ring 13 with a central axis of the first pulley 34 set coincident with that of the outer ring 13 (i.e., in such a manner that the axis serving as the center of rotation becomes coaxial with the central axis S of the outer ring 13), a second rotational shaft 38, which is inserted in such a manner that one end of the second rotational shaft 38 is connected to a drive shaft 18a of second drive means (in the present embodiment, an electric motor) 18 arranged outside the case 20 and the other end thereof is located inside the case 20 and which rotates, a second pulley 36, which is fixed to the second rotational shaft 38 with a central axis of the second pulley 36 set coincident with that of the second rotational shaft 38 (i.e., in such a manner that the axis serving as the center of rotation becomes coaxial with the central axis T of the second rotational shaft 38), and a transmission member 42, which is suspended to span between the first pulley 34 and the second pulley 36. For example, while the transmission member 42 is configured with a timing belt, the present embodiment is not limited to this, and the transmission member 42 can be configured with, for example, a chain and gears. Moreover, the second rotational shaft 38 is supported and fixed to the main body portion 21 of the case 20 in a rotatable manner via a bearing (for example, a magnetic fluid bearing) 46, which enables keeping the inside of the case 20 vacuum. Furthermore, since both the outer ring 13 and the first pulley 34 coupled to the outer ring 13 have an annular configuration, it is possible to perform, without any problem, work to cause the container 2 to pass through an opening space at the center and attach and detach the container 2 to and from the container holder 11.

According to the above-described configuration, it is possible to implement a structure which rotates the outer ring 13 with a rotational center thereof set on the same axis as the central axis S of the revolution member 12. Accordingly, in addition to obtaining a revolution action and rotation action for the container 2 as with a conventional configuration, it is possible to implement a configuration which rotates the outer ring 13, thus enabling variably adjusting the rotation speed of the container 2 while keeping the revolution speed of the revolution member 12 constant.

Here, the control unit is configured to perform control to cause the second drive means 18 to generate a drive force for rotating the outer ring 13 in a predetermined direction selected and set out of the same direction as and the direction opposite to the revolution direction of the revolution member 12. Furthermore, the rotational direction of the outer ring 13 is set by the operator as appropriate according to, for example, the property of a material or a required action (agitation or defoaming).

Additionally, the control unit is configured to, in the case of rotating the outer ring 13 in the "same direction" as the revolution direction of the revolution member 12, enable performing control to optionally set the rotational frequency of the outer ring 13 in a range of from 0 rpm to the same rotational frequency as the rotational frequency of the revolution member 12 (in the above-mentioned example, 800 rpm).

According to this configuration, in the case of rotating the outer ring 13 in the same direction as the revolution direction of the revolution member 12, the following function effect is obtained. First, if the rotational frequency of the outer ring 13 is set to 0 rpm, since it is possible to set the rotation speed of the container holder 11 and the container 2 to a high speed (in the above-mentioned example, two times the revolution speed), it is possible to obtain a high agitation action as mentioned above. Next, if the rotational frequency of the outer ring 13 is set to a predetermined rotational frequency (rpm) other than 0 rpm as appropriate, it is possible to make the rotation speed of the container holder 11 and the container 2 lower as appropriate according to the set rotational frequency (i.e., as the rotational frequency of the outer ring 13 is made higher, the rotation speed of the container holder 11 and the container 2 becomes lower). Accordingly, in the case of a material particularly high in viscosity, it is possible to prevent or reduce an increase in temperature caused by the material generating heat due to, for example, a frictional force or shearing force acting on the material. As a result, it becomes possible to solve issues in which, due to heat generation (an excessive increase in temperature) of the material, the deformation or deterioration of the material itself occurs and an agitation action decreases. Additionally, if the rotational frequency of the outer ring 13 is set to the same rotational frequency as the rotational frequency of the revolution member 12 (in the above-mentioned example, 800 rpm), it is possible to set the rotation speed of the container holder 11 and the container 2 to 0 rpm. This embodiment means that the present apparatus (agitating/defoaming apparatus 1) is able to be also used as a centrifuge. Accordingly, although an agitation action for a material decreases, it is possible to obtain a high defoaming action by a centrifugal action.

On the other hand, the control unit is configured to, even in the case of rotating the outer ring 13 in the "direction opposite" to the revolution direction of the revolution member 12, enable performing control to optionally set the rotational frequency of the outer ring 13 in a range of from 0 rpm to a predetermined rotational frequency (for example, about several hundreds of rpm).

According to this configuration, in the case of rotating the outer ring 13 in the direction opposite to the revolution direction of the revolution member 12, the following function effect is obtained. Specifically, if the rotational frequency of the outer ring 13 is set to a predetermined rotational frequency (rpm) other than 0 rpm as appropriate, it is possible to further make the rotation speed of the container holder 11 and the container 2 higher (i.e., as the rotational frequency of the outer ring 13 is made higher, the rotation speed of the container holder 11 and the container 2 becomes higher). Accordingly, since it is possible to further set the rotation speed of the container holder 11 and the container 2 to a higher speed, applying the above-described configuration to a material in which an issue of heat generation does not occur notably enables increasing an agitation action further.

Furthermore, according to the above-described configuration, it is possible to implement a structure which rotates the outer ring 13 coaxially with the central axis S of the revolution member 12. However, due to the outer ring 13 being supported in a rotatable manner, another issue may occur in which, when the revolution member 12 is caused to revolve, a frictional force received from the container holder 11 (specifically, the resin elastic ring 15 of the abutting contact portion 11a) revolving along with the revolution of the revolution member 12 may cause co-rotation of the outer ring 13.

To attain the solution of the above-mentioned issue, the agitating/defoaming apparatus 1 according to the present embodiment includes the following characteristic configuration. Specifically, the agitating/defoaming apparatus 1 includes rotation restriction means which restricts rotation of the outer ring 13 in such a manner that the outer ring 13 enters into a stationary state with respect to the case 20. This enables preventing co-rotation of the outer ring 13, applying a frictional force to the container holder 11, and thus obtaining a rotation action for the container holder 11 and the container 2.

As an example of the rotation restriction means, a configuration is conceivable which restricts rotation of the outer ring 13 in such a manner that the outer ring 13 enters into a stationary state with respect to the case 20 by the control unit performing control to cause the second drive means 18 to generate a drive force for rotating the first pulley 34 in the direction opposite to the direction in which the outer ring 13 co-rotates by a frictional force received from the container holder 11 revolving along with revolution of the revolution member 12. For example, since, when the rotational frequency of the second rotational shaft 38 connected to the second drive means 18 is set to 0 rpm, the above-mentioned stationary state is obtained, for example, a configuration which includes, for example, a rotational angle sensor for the second rotational shaft 38 to perform detection and control is conceivable.

Alternatively, as an example of the rotation restriction means, a configuration in which a stopper (not illustrated) which mechanically restricts rotation of the outer ring 13 by engaging with the case 20 and the outer ring 13 is provided can also be employed.

As described above, according to an agitating/defoaming apparatus according to the present invention, it is possible to implement a configuration capable of obtaining a revolution action and rotation action for a container and rotating an outer ring and it becomes possible to variably adjust the rotation speed while keeping the revolution speed constant. With this configuration, with respect to a material relatively high in viscosity, since it is possible to adjust the rotation speed to a low speed and to prevent or reduce an increase in temperature of the material caused by, for example, a frictional force or shearing force acting on the material, it is possible to prevent the transformation or deterioration of the material and it is possible to prevent a decrease in agitation action. On the other hand, with respect to a material relatively low in viscosity, it is possible to adjust the rotation speed to a high speed and it is possible to increase an agitation action further.

Furthermore, the present invention is not limited to the above-described embodiments but can be modified or altered in various manners in a range not departing from the present invention. For example, a configuration in which characteristic mechanisms (for example, a cold air generator and a dry air generator) disclosed in an agitating/defoaming apparatus (Japanese Patent No. 5,711,425) developed by the present applicant or assignee are additionally provided as appropriate can also be employed.

What is claimed is:

1. An agitating and defoaming apparatus, comprising:
   a plurality of container holders, each of the plurality of container holders holding a container;
   a revolution member supporting each of the plurality of container holders so as to be rotatable, the revolution member being provided in such a way as to be rotatable on a first rotational shaft, the revolution member being configured to cause each of the plurality of container holders to revolve around the first rotational shaft;
   a first drive for rotationally driving the revolution member;
   an annular outer ring arranged to surround the plurality of container holders in such a manner that an inner circumferential portion of the outer ring is in abutting contact with an outer circumferential portion of each of the plurality of container holders;
   a case formed so as to be hermetically sealable and having at least the containers, the plurality of container holders, the revolution member, and the outer ring arranged therein; and
   a control unit which performs drive control,
   wherein the plurality of container holders and the outer ring are arranged in such a manner that an abutting contact portion annularly provided at an outer circumferential portion of each of the plurality of container holders and an abutting contact surface provided at the inner circumferential portion of the outer ring are in abutting contact with each other,
   wherein each of the plurality of container holders has a configuration to revolve around the first rotational shaft by revolution of the revolution member and rotate by a frictional force received from the outer ring, and
   wherein the agitating and defoaming apparatus further comprises an outer ring rotation mechanism, which is configured to rotate the outer ring with a central axis of the outer ring set coincident with a central axis of the revolution member.

2. The agitating and defoaming apparatus according to claim 1, wherein the outer ring rotation mechanism includes:
   a bearing member, the bearing member being arranged inside the case and supporting the outer ring in a rotatable manner;
   an annular first pulley, the annular first pulley being fixed to the outer ring with a central axis of the first pulley set coincident with that of the outer ring;
   a second rotational shaft, the second rotational shaft being inserted in such a manner that one end of the second rotational shaft is connected to a drive shaft of a second drive arranged outside the case and another end of the second rotational shaft is located inside the case;

a second pulley, the second pulley being fixed to the second rotational shaft with a central axis of the second pulley set coincident with a central axis of the second rotational shaft; and a transmission member, the transmission member being suspended to span between the first pulley and the second pulley.

3. The agitating and defoaming apparatus according to claim 2, wherein the control unit is configured to cause the second drive to generate a drive force for rotating the outer ring in a direction identical to and a direction opposite to a revolution direction of the revolution member, and when rotating the outer ring in the direction identical to the revolution direction, cause a rotational frequency of the outer ring in a range of from 0 turns to a rotational frequency identical to a rotational frequency of the revolution member.

4. The agitating and defoaming apparatus according to claim 3, further comprising a rotation restriction mechanism, the rotation restriction mechanism being configured to restrict rotation of the outer ring in such a manner that the outer ring enters into a stationary state with respect to the case.

5. The agitating and defoaming apparatus according to claim 4, wherein the rotation restriction mechanism is configured to restrict rotation of the outer ring in such a manner that the outer ring enters into a stationary state with respect to the case by the control unit being configured to cause the second drive to generate a drive force for rotating the first pulley in a direction opposite to a direction in which the outer ring co-rotates by a frictional force received from each of the plurality of container holders revolving along with revolution of the revolution member.

6. The agitating and defoaming apparatus according to claim 2, further comprising a rotation restriction mechanism, the rotation restriction mechanism being configured to restrict rotation of the outer ring in such a manner that the outer ring enters into a stationary state with respect to the case.

7. The agitating and defoaming apparatus according to claim 6, wherein the rotation restriction mechanism is configured to restrict rotation of the outer ring in such a manner that the outer ring enters into a stationary state with respect to the case by the control unit being configured to cause the second drive to generate a drive force for rotating the first pulley in a direction opposite to a direction in which the outer ring co-rotates by a frictional force received from each of the plurality of container holders revolving along with revolution of the revolution member.

* * * * *